United States Patent [19]

Crane et al.

[11] Patent Number: 4,728,363
[45] Date of Patent: Mar. 1, 1988

[54] ACICULAR MAGNETIC PARTICLES

[75] Inventors: Jacob Crane, Woodbridge; George J. Muench, West Haven; Yousef Saleh, Branford, all of Conn.

[73] Assignee: Olin Corporation, New Haven, Conn.

[21] Appl. No.: 932,098

[22] Filed: Nov. 18, 1986

Related U.S. Application Data

[60] Division of Ser. No. 803,379, Dec. 2, 1985, Pat. No. 4,657,583, which is a continuation-in-part of Ser. No. 773,484, Sep. 9, 1985, abandoned.

[51] Int. Cl.[4] ............................................. B22F 1/00
[52] U.S. Cl. ..................................... 75/251; 148/312; 148/315
[58] Field of Search ................. 75/251; 148/312, 315; 420/92, 94, 458, 459, 581, 582

[56] References Cited

U.S. PATENT DOCUMENTS

| | | |
|---|---|---|
| 1,628,190 | 8/1927 | Raney .............................. 75/0.5 AA |
| 2,879,154 | 3/1959 | Campbell ............................. 75/251 |
| 4,093,477 | 6/1978 | Iwata et al. ......................... 148/108 |
| 4,246,316 | 1/1981 | Aonuma et al. ....................... 75/251 |
| 4,257,830 | 3/1981 | Tsuya et al. ......................... 148/112 |
| 4,274,865 | 6/1981 | Suzuki et al. ..................... 75/0.5 AA |
| 4,290,799 | 9/1981 | Schroeder et al. ................. 75/0.5 A |
| 4,461,685 | 7/1984 | Pryor ................................. 204/146 |
| 4,464,916 | 8/1984 | French ............................ 75/0.5 AA |
| 4,465,264 | 8/1984 | Lin .................................... 266/114 |
| 4,540,477 | 9/1985 | Lin .................................... 204/242 |
| 4,544,463 | 10/1985 | Pryor ................................ 204/146 |
| 4,648,437 | 3/1987 | Pryor et al. ......................... 164/463 |
| 4,663,242 | 5/1987 | Pryor et al. ......................... 428/558 |

FOREIGN PATENT DOCUMENTS 133638 8/1946 Australia ...................... 75/0.5 AA

OTHER PUBLICATIONS

"Spinodal Structures", by Karl B. Rundman, *Metals Handbook*, vol. 8, 1973, pp. 184–185.
"Cunife-I", *Alloy Digest*, Aug. 1961.

*Primary Examiner*—John P. Sheehan
*Attorney, Agent, or Firm*—Paul Weinstein

[57] ABSTRACT

The present invention relates to a method for producing magnetic particles for use in recording media. The method comprises providing an alloy capable of forming a magnetic precipitate, aging the alloy to form a magnetic precipitate comprising a plurality of magnetic particles dispersed throughout a surrounding matrix; and dissolving the matrix to leave the magnetic particles. Magnetic particles produced by the present method are characterized by a size in the range of about 100 Å to about 2000 Å, a single magnetic domain, an aspect ratio up to about 10:1, a relatively smooth surface, and a substantially uniform composition throughout.

6 Claims, No Drawings

ACICULAR MAGNETIC PARTICLES

This application is a division of U.S. patent application Ser. No. 803,379, filed Dec. 2, 1985, now U.S. Pat. No. 4,657,583, issued Apr. 14, 1987, which is a continuation-in-part of U.S. patent application Ser. No. 773,484, filed Sept. 9, 1985, now abandoned. This application is also related to U.S. patent application Ser. No. 773,769, filed Sept. 9, 1985, now U.S. Pat. No. 4,668,355, issued May 26, 1987.

The present invention relates to magnetic particles to be used for magnetic recording media.

The goal of magnetic recording technology is to write a magnetization pattern onto a magnetic medium and then read the pattern at some later time. The essential components of a recording system are the read/write head, the magnetic medium, the mechanical systems which manipulate the head and/or the media, and the electronics which process the input and output signals. The magnetic medium is typically a dispersion of ferromagnetic particles in an organic binder which is coated onto a substrate. The substrate can be a polyester such as MYLAR for flexible media or metal such as aluminum alloy 7075 for rigid disks.

The requirements for such magnetic media include: (1) that the magnetization direction of the media can be altered by the head during writing; and (2) that a large stable magnetization be retained for reading. The two most important magnetic characteristics of the media are the magnetization which remains after the applied field is removed and the applied field necessary to reduce the net magnetization to zero. These are called the remanent magnetization and the coercive field, respectively.

Media with high magnetization are desired because all other things being equal, higher magnetization yields a higher signal to be read. In a well prepared media with preferentially aligned particles, the remanent magnetization is about 90% of the saturation magnetization. The magnetic stability of the media is a function of its coercive field. Generally, the coercive field is at some intermediate value between two limits defined by the following considerations. If the coercive field is too large, the magnetic field generated by the write head is insufficient to alter the media. If, however, the coercive field is too small, the media is easily demagnetized and the recorded pattern is not stable. Thus, the general aim in the development of new magnetic materials for recording purposes is to develop materials characterized by a relatively high coercive field and saturation magnetization.

Various magnetic powder materials have been proposed for use in preparing magnetic recording media. These materials include $\gamma$-$Fe_2O_3$, Co-doped $\gamma Fe_2O_3$, $Fe_3O_4$, Co-doped $Fe_3O_4$, $Fe_3O_4$-$\gamma$-$Fe_2O_3$, and $CrO_2$. However, the magnetic characteristics of these materials are generally insufficient to achieve the high density recordings sought by the recording industry. As a result, attention has focused on ferromagnetic metal and alloy materials as being most promising to achieve the aims of the recording industry.

U.S. Pat. No. 4,274,865 to Suzuki et al. and U.S. Pat. No. 4,290,799 to Schroeder et al. illustrate prior art processes for preparing ferromagnetic metal or alloy powder materials. In the Suzuki et al. approach, a magnetic powder consisting mainly of iron is produced by applying or adsorbing or depositing one or more compounds of zinc, chromium, and copper on a particulate iron oxyhydroxide or oxide material and then reducing the thus treated material with a reducing gas such as hydrogen to form a magnetic powder consisting mainly of iron. The Schroeder et al. approach produces a metal powder consisting essentially of acicular iron particles by precipitating and oxidizing an aqueous iron (II)- salt solution to produce finely divided acicular iron (III)-oxide-hydroxide; stabilizing the iron (III)-oxide-hydroxide by treatment with cadmium, lead, calcium, magnesium, zinc, aluminum, chromium, tungsten, a phosphorous oxide and/or a boron oxide; converting the stabilized material into ferromagnetic iron oxide; and reducing it to metallic iron with a gaseous reducing agent.

Other approaches for forming magnetic particles include vacuum evaporation, thermal decomposition of carbonyls, and reduction by borohydrides of iron in solution. Still another approach employs rapid solidification techniques to form thin metallic ribbons containing magnetic particles. In this approach, a melt containing magnetic material is formed and ejected under pressure onto a moving or rotating cooling substrate. As soon as the molten material contacts the cooling substrate, the melt quickly cools and solidifies into a thin ribbon. The magnetic particles are distributed therein. U.S. Pat. No. 4,257,830 to Tsuya et al. and U.S. Pat. No. 4,461,685 to Pryor illustrate the use of rapid solidification technology to form magnetic particles. While rapid solidification techniques produce magnetic particles of good quality, their primary deficiency is their inability to produce particles having identical or substantially similar sizes. From the standpoint of forming particles having substantially uniform magnetic properties, it is highly desirable to employ a technique that forms substantially uniformly sized magnetic particles. Particle size tends to define the magnetic properties of the particle and substantially identically sized particles exhibit substantially identical magnetic properties. Non-identical sized particles may cause unwanted noise problems.

The size and morphology of the magnetic particles can be used to control the magnetic properties of the particle. All other things being equal, it has been found that there is a critical size for maximum coercivity. At this critical size, particles are uniformly and permanently magnetized and are said to have a single magnetic domain. For iron particles at room temperature, this critical size is about 300 Å. Particles larger than the critical size contain a plurality of magnetic domains. Magnetization changes in multi-domain particles require less energy and therefore, have a lower coercive field than single domain particles. Particles smaller than the critical size are susceptible to thermal fluctuations in their magnetization direction which can spontaneously demagnetize a particle assemble. Particle morphology is important in that acicular single domain particles have been found to provide a higher coercive field than spherical particles. Furthermore, the magnetization direction tends to lie along the long axis of the particle. This shape anisotropy may be used to control the coercive field of magnetic recording particles. For example, the calculated coercive field of ellipsoidal iron particles with aspect ratios of 1.1:1 and 1.2:1 are about 700 Oe and 2000 Oe respectively.

Accordingly, it is an object of the present invention to provide magnetic particles to be used in recording media.

It is a further object of the present invention to provide an improved method for forming such magnetic particles.

It is yet a further object of the present invention to provide a method as above for forming magnetic particles for use in recording media.

It is yet a further object of the present invention to provide a method as above for forming free acicular magnetic particles characterized by a substantially uniform size and composition and a relatively smooth surface.

These and further objects and advantages will become more apparent from the following description.

In accordance with the present invention, free magnetic particles are produced by providing an alloy capable of forming a magnetic precipitate upon thermal aging; aging the alloy to form the magnetic precipitate in a surrounding matrix; and thereafter dissolving the matrix to leave the magnetic particles. One of the primary advantages of the present technique is that it may be used with a wide variety of starting materials. For example, it could be used with a number of copper-base, iron-base, nickel-base, gold-base and manganese-base alloy systems. Another advantage of the present invention is that dissolution of the matrix may be accomplished in any suitable manner including using chemical and electrolytic dissolution techniques.

The magnetic particles produced by the method of the present invention have been found to exhibit improvement in many of the features and properties desired by the recording industry. For example, the particles are acicular in shape, chemically stable, and tend to be single magnetic domain particles. The particles are further characterized by a relatively smooth surface which is significant from a magnetization per unit volume standpoint and a face centered cubic structure. Additionally, the particles are substantially uniform in size and composition. As previously discussed, the ability to produce nearly identical particles having a substantially uniform size and composition is very desirable from the standpoint of having particles with substantially uniform magnetic properties.

The present invention relates to the formation of free magnetic particles for use in recording media using a thermal treatment to produce the magnetic particles. It has been surprisingly found that by using this thermal treatment better control of the particles' magnetic and physical properties such as size can be obtained. While the invention will be described in detail with reference to a particular copper base alloy starting material and the formation of ferromagnetic particles, it should be recognized that the present invention has broad application to a wide variety of materials and the formation of a wide variety of different types of magnetic particles. The only constraint on the choice of an appropriate starting material is that it must be one capable of forming a magnetic precipitate preferably by thermal aging. The magnetic precipitate so formed should be preferably characterized by the presence of acicular magnetic particles. Suitable starting materials include copper base alloy systems such as copper-iron-nickel, copper-iron-nickel-aluminum, and copper-nickel-cobalt; iron base alloy systems such as iron-chromium-cobalt, iron-nickel-aluminum, and iron-platinum; gold-base alloy systems such as gold-iron-nickel; manganese-base alloy systems; and nickel-base alloy systems. A particular alloy system which has been found to be quite useful for forming ferromagnetic particles is a copper base alloy containing about 10% to about 40% iron, about 10% to about 40% nickel and the balance essentially copper. If desired, the copper base alloy may contain up to 40% of cobalt, chromium, zirconium, magnesium and/or manganese either as additional elements for assisting in alloy casting and/or processing or as substitutes for some of the iron and/or nickel content of the alloy. The foregoing percentages are weight percentages.

The starting material may be initially processed in any desired conventional manner into any desired form such as a strip material. For example, a base metal may be melted and desired alloying additions may be made to the melt in accordance with conventional practices. The melt may then be cast in any desired manner. After being cast, the starting material may be homogenized and quenched, hot worked such as by hot rolling and/or cold worked such as by cold rolling until the material has reached a desired gage. If desired, the material may be subjected to one or more interanneals during processing. For example, the aforementioned copper base alloy may be processed as follows. After casting, the alloy may be homogenized at a temperature above about 1000° C. for about 30 minutes to about 350 hours, cooled to room temperature at a cooling rate that preferably doesn't impair subsequent cold workability, and then cold worked, e.g. cold rolled. This processing cycle may be repeated one or more times until the material reaches a desired gage. The foregoing processing steps may be carried out in any suitable manner known in the art.

After the material has been processed to the desired gage, the material is preferably solution heat treated and quenched. Both solution heat treatment and quenching of the material may be performed in any suitable manner known in the art. For the aforementioned copper-nickel-iron alloy system, the solution heat treatment step may be performed at a temperature in the range of about 950° C. to about 1200° C. for a time in the range of about 1 minute to about 48 hours. Preferably, the solution heat treatment is carried out at a temperature in the range of about 1000° C. to about 1100° C. for a time in the range of about 1 minute to about 4 hours. For certain alloy systems, the solution heat treating and quenching steps may be omitted since the quenching after hot working serves the same purpose.

The final step of the material processing comprises thermal treatment of the material to produce magnetic particles. It has been discovered that one can form a magnetic precipitate, preferably comprising acicular magnetic particles, by thermal aging of the processed starting material and that the magnetic and physical properties exhibited by these particles are significantly better than the properties of particles produced by other techniques. Any suitable thermal aging technique known in the art including isothermal aging, controlled cooling, and programmed temperature aging may be used to practice the present invention and form the magnetic precipitate. Of course, certain materials lend themselves to certain aging techniques and the choice of a particular aging technique may be limited by the material being processed. Preferably, the aging technique employed will form a magnetic precipitate comprising a plurality of acicular magnetic particles dispersed throughout a matrix.

For the copper-nickel-iron alloy system discussed above, aging separates the alloy into a copper-rich matrix and iron-nickel rich magnetic particles. It has been found that the magnetic particles tend to have a composition consisting essentially of from about 35% to about 60% nickel, up to about 15% copper, and from about 35% to about 65% iron. Other elements may be present in relatively small amounts depending upon the composition of the starting material. It is believed that this alloy system decomposes spinodally to form the two phases. For this copper-base alloy system, thermal aging may be carried out at a temperature in the range of about 550° C. to about 800° C., preferably at a temperature in the range of about 600° C. to about 700° C. for a time period up to about 48 hours, preferably a time in the range of about 1 to about 8 hours.

When processing certain alloy systems, it may be desirable to cold work, e.g. cold roll, the material just prior to the thermal aging step to effect the morphology and size of the particles and the type of precipitate to be formed. The degree of cold work applied to the material will of course depend upon the desired particle properties and/or to assist the subsequent separation of the particles from the matrix.

The magnetic precipitates are preferably recovered from the matrix by dissolving the matrix and collecting the free magnetic particles. Dissolution of the matrix may be performed using any suitable method. For example, dissolution of the matrix may be done chemically by immersion in an appropriate chemical solution. Alternatively, the matrix may be dissolved by electrolysis. Whatever dissolution technique is employed, it is preferred that dissolution of the matrix be done without any substantial dissolution of the magnetic particles.

When a chemical dissolution technique is used, the material containing the magnetic particles may be immersed in any suitable solution known in the art capable of dissolving the matrix without significant dissolution of the magnetic particles. The only constraints on the choice of solution are: (1) that the solution should not significantly attack the magnetic particles; and (2) that the solution should preferably assist in forming a passive layer about each magnetic particle. Passivation of the magnetic particles is desirable to prevent further oxidation and corrosion of the particles. Generally, a passive layer comprises an oxygen impervious barrier such as an oxide layer about each particle. It is quite important that any passive layer about each particle not be disturbed by the dissolution solution.

Solutions which may be used to chemically dissolve a copper-rich matrix include aqueous solutions containing from about 0.5M to about 3.5M of free ammonia, e.g. ammonium hydroxide solutions, having a pH greater than about 8. In a preferred embodiment, an aqueous ammonium hydroxide solution containing from about 1M. to about 2M. ammonium hydroxide and from about 10 g/l to 50 g/l, preferably from about 20 g/l to about 40 g/l copper and having a pH in the range of about 9 to about 11 is used as a chemical dissolution solution. The solutions may be maintained at any desired temperature during the chemical dissolution process. Typically, the solutions are kept at a temperature in the range of from about room temperature to about 50° C. Generally, the processed material is immersed in the solution until the matrix is dissolved.

After the matrix has been dissolved, the free magnetic particles may be collected in any desired manner. For example, a magnet could be used to collect the magnetic particles from the bottom of a container. After being collected, the particles may be rinsed in water to remove unwanted chemical contaminants from the particles.

It has been discovered that aqueous citrate solutions are particularly useful in removing the iron-nickel rich magnetic particles dispersed in the copper-rich matrix formed by thermally aging the copper-nickel-iron alloy system described above. This is because citrate solutions tend to be stable and tend to form a passive layer about the particles. Suitable solutions include those that contain a citrate ion concentration in the range of about 5M to about 3M. Preferred solutions are those that contain a citrate ion concentration in the range of about 1M. to about 2M. The solution may be made up from an alkaline metal citrate such as sodium citrate and/or citric acid in any desired manner. The relative proportions of each constituent should be such that the solution has a pH greater than about 3, preferably greater than about 4. If desired, the citrate solution used to dissolve the copper-rich matrix may contain copper powder or a copper salt such as copper sulfate. If copper is present in the solution, it is preferred that it be present in an amount greater than about 0.3M.

After the citrate solution has been prepared, it may be used as an electrolyte in an electrolytic cell containing two or more electrodes. To free the magnetic particles, the material containing the copper-rich matrix and the iron-nickel rich magnetic particles is immersed in the citrate solution electrolyte. An electrical current is passed between the electrodes in a known manner. During electrolysis, the electrolyte may be kept at a temperature in the range of about room temperature to about 50° C. The cell may be provided with an appropriate heating/cooling loop to maintain the electrolyte at the desired temperature.

As the matrix anodically dissolves, the free magnetic particles may be collected in any desired manner. It is important to remove the magnetic particles, particularly from the surface of the electrode(s), so that they do not interfere with the dissolution of the anodic species, namely the matrix. As before, the collected particles may be rinsed in water after removal from the electrolyte to remove any unwanted chemical contaminants. Citrate solutions are also advantageous because they are non-toxic and do not require any special waste treatment facilities.

It has been discovered that the magnetic particles formed by the method of the present invention exhibit many of the characteristics desired for recording media. For example, they are acicular in shape and are characterized by a saturation magnetization greater than about 80 EMU/g, preferably greater than about 100 EMU/g, a coercive field in the range of about 300 Oe to about 2000 Oe, preferably from about 500 Oe to about 1500 Oe, and substantially uniform aspect ratios up to about 10:1, preferably in the range of about 1.5:1 to about 8:1. It has been found that the lower the copper content of the particles, the better the magnetic properties. Therefore, it is believed that the better magnetic properties are obtained if the particles have a composition wherein nickel is present in an amount from about 40% to about 55%, copper is present in an amount less than about 9%, and the balance is essentially iron. Of course, the foregoing percentages are weight percentages.

The particles formed by the technique of the present invention have a monolithic, wholly face centered cubic structure except for any surface oxides. Surface oxides, if present, tend to have an indeterminate crystallographic structure. The particles are further characterized by a substantially uniform size, substantially uniform composition throughout, a relatively smooth surface and being in an aged condition. The term aged condition as used herein means the condition resulting from an aging process. In addition, the particles are chemically stable, a somewhat surprising result, are single magnetic domain particles and exhibit a length in the range of about 100 Å to about 2000 Å, preferably from about 300 Å to about 1500 Å. As a result of these characteristics, the particles produced by the present invention tend to exhibit substantially uniform magnetic properties.

The ability to produce a particle having a relatively smooth surface is particularly significant in that such particles exhibit an increase in magnetization per unit volume and reduced noise. The ability to produce particles of a substantially identical nature is also important from the standpoint of reducing noise problems.

To form recording media, the magnetic particles of the present invention are formed into a dispersion and coated onto an appropriate substrate material as a magnetic layer. The magnetic layer generally comprises a plurality of magnetic particles dispersed in a binder material such as a polyurethane. The magnetic layer may also contain a dispersant such as lecithin, a lubricant, conductive pigments, solvents and/or abrasives. The type of substrate material used of course depends upon the type of recording media to be formed. For example, the substrate material may be aluminum or an aluminum alloy for rigid media or a plastic material such as polyethylene terephthalate for flexible media. Any suitable method known in the art may be used to form the recording media. The particular method employed does not form part of the present invention. To illustrate the present invention, the following examples were performed.

EXAMPLE I

An alloy having a composition consisting essentially of 20% iron, 20% nickel, 0.2% magnesium and the balance essentially copper was prepared. A sample of the alloy was homogenized at 1100° C. for 4 hours and rapidly cooled. The alloy sample was then cold rolled to 0.030", heat treated at 1100° C. for 2 hours and rapidly cooled to insure homogeneity. The material was then thermally aged at 650° C. for 4 hours to effect decomposition of the homogenized material into ferromagnetic particles in a copper-rich matrix. The copper-rich matrix was then dissolved using an aqueous ammonium hydroxide solution containing 3M. ammonium hydroxide, 0.25M. ammonium sulfate and 20 g/l copper. The magnetic particles were then recovered from the solution. The magnetic properties of the particles are given below and are compared with typical magnetic media.

|  | Saturation Magnetization (EMU/g) | Coercive Field (Oe) |
|---|---|---|
| Extracted particles | 110 | 600 |
| γFe$_2$O$_3$ particles | 75 | 300 |
| Co—γFe$_2$O$_3$ | 73 | 550 |
| CrO$_2$ particles | 73 | 650 |

EXAMPLE II

Samples containing ferromagnetic particles in a copper-rich matrix were prepared as in Example I. The copper-rich matrix was electrolytically dissolved using an aqueous citrate solution. The aqueous citrate solution had a pH of 6 and contained 1M. sodium citrate and 0.3M. copper sulfate. The solution was kept at room temperature and provided to the electrolytic cell at a flow rate of 10 cm/sec. A potential of 1000 mV$_{SHE}$ or a current density of 35 mA/cm$^2$ was applied to electrodes immersed in the solution.

The magnetic particles were recovered from the solution and their magnetic properties were measured. The recovered particles exhibited a saturation magnetization in the range of 110 EMU/g to 120 EMU/g and a coercive field in the range of 580 Oe to 700 Oe.

While it is preferred that the thermal aging step be the final processing step before dissolution of the matrix, it may be necessary with some alloy systems to further cold work the material after the thermal aging treatment to assist the dissolution process.

The patents set forth in the specification are intended to be incorporated by reference herein.

It is apparent that there has been provided in accordance with this invention acicular magnetic particles which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed:

1. Free acicular magnetic particles characterized by a face-centered cubic structure, a length in the range of 100Å to about 2000Å and an aspect ratio up to about 10:1.

2. The particles of claim 1 further being characterized by:
    said length being in the range of about 300Å to about 1500Å; and
    said aspect ratio being in the range of about 1.5:1 to about 8:1.

3. The particles of claim 1 further comprising:
    said particles containing from about 35% to about 60% nickel, up to about 15% copper, and from about 35% to about 65% iron.

4. The particles of claim 1 further comprising:
    said particles containing from about 40% to about 55% nickel, less than about 9% copper and the balance essentially iron.

5. The particles of claim 1 further being characterized by a single magnetic domain.

6. The particles of claim 1 further being characterized by having a saturation magnetization greater than about 80 EMU/g and a coercive field in the range of about 300 Oe to about 2000 Oe.

* * * * *

UNITED STATES PATENT AND TRADEMARK OFFICE
CERTIFICATE OF CORRECTION

PATENT NO. : 4,728,363
DATED : March 1, 1988
INVENTOR(S) : Jacob Crane, George J. Muench, Yousef Saleh and Lifun Lin It is certified that error appears in the above—identified patent and that said Letters Patent is hereby corrected as shown below: On The Title Page:

In the Inventors: after Yousef Saleh, Branford, insert ---Lifun Lin, Hamden---.

Signed and Sealed this

First Day of November, 1988

Attest:

DONALD J. QUIGG

Attesting Officer

Commissioner of Patents and Trademarks